United States Patent
Shirahama et al.

(10) Patent No.: US 7,151,572 B2
(45) Date of Patent: Dec. 19, 2006

(54) APPARATUS AND METHOD FOR PROCESSING PREDETERMINED PROGRAM DATA

(75) Inventors: Akira Shirahama, Kanagawa (JP); Shinichiro Miyazaki, Kanagawa (JP); Seigo Hirakawa, Chiba (JP)

(73) Assignee: Sony Corporation (JP)

(*) Notice: Subject to any disclaimer, the term of this patent is extended or adjusted under 35 U.S.C. 154(b) by 139 days.

(21) Appl. No.: 09/854,287

(22) Filed: May 11, 2001

(65) Prior Publication Data

US 2002/0067436 A1    Jun. 6, 2002

(30) Foreign Application Priority Data

May 16, 2000    (JP)    ............................ P2000-143215

(51) Int. Cl.
| | |
|---|---|
| H04N 5/44 | (2006.01) |
| H04N 7/00 | (2006.01) |
| H04N 7/08 | (2006.01) |
| H04N 11/00 | (2006.01) |

(52) U.S. Cl. .................... 348/554; 348/254; 348/465; 348/626; 348/725; 725/45; 725/139

(58) Field of Classification Search ........ 348/553–554, 348/473, 474, 461, 465, 468, 460, 725–727; 725/37, 139; 375/240.26; 345/133, 611; H04N 5/44, H04N 7/00, 7/08, 11/00
See application file for complete search history.

(56) References Cited

U.S. PATENT DOCUMENTS

| | | | | |
|---|---|---|---|---|
| 5,541,662 A | * | 7/1996 | Adams et al. ............... | 348/460 |
| 5,600,378 A | * | 2/1997 | Wasilewski ................. | 348/468 |
| 5,844,478 A | * | 12/1998 | Blatter et al. ............... | 348/474 |
| 5,856,973 A | * | 1/1999 | Thompson .................. | 370/389 |
| 6,028,600 A | * | 2/2000 | Rosin et al. ................. | 715/718 |
| 6,064,378 A | * | 5/2000 | Chaney et al. .............. | 725/39 |
| 6,151,078 A | * | 11/2000 | Yoneda et al. .............. | 348/558 |
| 6,157,673 A | * | 12/2000 | Cuccia ........................ | 375/240 |
| 6,172,719 B1 | * | 1/2001 | Kim ............................ | 348/655 |
| 6,188,439 B1 | * | 2/2001 | Kim ............................ | 348/553 |
| 6,215,530 B1 | * | 4/2001 | Wasilewski ................. | 348/731 |
| 6,271,893 B1 | * | 8/2001 | Kawaguchi et al. ........ | 348/725 |
| 6,292,226 B1 | * | 9/2001 | Yamanaka et al. ......... | 348/556 |
| 6,320,623 B1 | * | 11/2001 | Cavallerano et al. ....... | 348/553 |
| 6,342,925 B1 | * | 1/2002 | Akhavan et al. ............ | 348/563 |
| 6,373,904 B1 | * | 4/2002 | Sakamoto et al. .......... | 375/316 |
| 6,411,335 B1 | * | 6/2002 | Jang ............................ | 348/553 |
| 6,414,954 B1 | * | 7/2002 | Miyamoto ................... | 370/389 |
| 6,490,728 B1 | * | 12/2002 | Kitazato et al. ............. | 725/151 |
| 6,493,043 B1 | * | 12/2002 | Bollmann et al. ........... | 348/714 |
| 6,505,347 B1 | * | 1/2003 | Kaneko et al. .............. | 725/39 |
| 6,580,462 B1 | * | 6/2003 | Inoue et al. ................. | 348/460 |
| 6,588,014 B1 | * | 7/2003 | Hayashi ....................... | 725/54 |

(Continued)

FOREIGN PATENT DOCUMENTS

EP    1156670 A2 * 11/2001

*Primary Examiner*—Brian P. Yenke
(74) *Attorney, Agent, or Firm*—Lerner, David, Littenberg, Krumholz & Mentlik, LLP (57) ABSTRACT

An information-processing device receives and processes predetermined program data. The information-processing device includes an extracting unit for extracting image data and audio data of a program selected by a user, an obtaining unit for obtaining information related to the selected program, and a setting unit for setting a control parameter for controlling an image data display or an audio data output of the selected program in accordance with the related information.

15 Claims, 5 Drawing Sheets

U.S. PATENT DOCUMENTS

| | | |
|---|---|---|
| 6,609,251 B1 * | 8/2003 | Yoneda ........................ 725/71 |
| 6,665,017 B1 * | 12/2003 | Raiyat ........................ 348/468 |
| 6,675,388 B1 * | 1/2004 | Beckmann et al. ......... 725/136 |
| 6,859,937 B1 * | 2/2005 | Narayan et al. .............. 725/37 |
| 2002/0019988 A1 * | 2/2002 | Shirahama et al. ......... 725/139 |
| 2004/0088739 A1 * | 5/2004 | Shimoji et al. ............. 725/135 |
| 2005/0044577 A1 * | 2/2005 | Jerding et al. .............. 725/135 |

* cited by examiner

GENRE OF RECOGNIZED PROGRAM : MOVIE

| | |
|---|---|
| BRIGHTNESS | DECREASE |
| SHARPNESS | DECREASE |
| COLOR TEMPERATURE | DECREASE |
| NR (NOISE REDUCTION) | OFF |
| VM (VELOCITY MODULATION) | OFF |
| GAMMA CORRECTION | INCREASE |

FIG. 5B

GENRE OF RECOGNIZED PROGRAM :
SPORTS (SOCCER)

| | |
|---|---|
| CONTRAST | DECREASE |
| SHARPNESS | INCREASE |
| COLOR TEMPERATURE | INCREASE |
| VM (VELOCITY MODULATION) | INCREASE |
| SCANNING MODE | SEQUENTIAL SCANNING |

APPARATUS AND METHOD FOR PROCESSING PREDETERMINED PROGRAM DATA

CROSS-REFERENCE TO RELATED APPLICATIONS

The present application claims priority from Japanese Application No. P2000-143215 filed May 16, 2000, the disclosure of which is hereby incorporated by reference herein.

BACKGROUND OF THE INVENTION

The present invention relates to image processing devices, image processing methods, and storage media, and more particularly relates to an image processing device, an image processing method, and a storage medium so that a received television broadcast program can be always displayed at an optimal image quality by automatically adjusting an image quality display setting.

Recently, digital broadcasting has become more widespread. In digital broadcasting, data such as audio and video data are compressed using an MPEG (Moving Picture Experts Group) method and then broadcast.

Due to data compression techniques, a broadcast program whose content size is approximately ten times that of an analog broadcast counterpart can be broadcast using digital broadcasting.

Conventional television receivers are provided with a function for setting various image qualities, and the image quality can be adjusted according to each user's preference. Since many types of contents such as moving images, still images, characters, and diagrams can be broadcast due to the development of digital television broadcasting, a greater variety and finer image quality setting is demanded.

Since, in the conventional television receivers, it is required that users manually set image qualities while confirming resulting images displayed on the television receiver, users may find it difficult to finely set the image qualities. Accordingly, users do not usually set the image quality for each broadcast program they watch and, therefore, most of them watch broadcast programs using the same image quality setting. Therefore, users cannot fully take advantage of advanced features provided in the television receiver.

SUMMARY OF THE INVENTION

Accordingly, the present invention is made to solve the foregoing problem. It is an object of the present invention to provide an information-processing device, an information-processing method and a storage medium which always provide a broadcast program at optimal image quality to users by automatically adjusting display settings in accordance with the broadcast program being watched.

To this end, according to a first aspect of the present invention, there is provided an information-processing device for receiving and processing predetermined program data. The information-processing device includes an extracting unit operable to extract image data and audio data of a program selected by a user, an obtaining unit operable to obtain information related to the selected program, and a setting unit operable to set a control parameter for controlling an image data display or an audio data output of the selected program in accordance with the related information.

In the information-processing device, the extracting unit may extract the image data and the audio data of the selected program from a transport stream.

In the information-processing device, the obtaining unit may obtain the related information from service information included in the transport stream.

The information-processing device may further include a storage unit operable to store the control parameter.

The information-processing device may further include an adjusting unit operable to adjust the control parameter in accordance with input from the user.

In the information-processing device, the brightness or the sharpness of the image data display may be controlled using the control parameter.

In the information-processing device, the control parameter may be adjusted in accordance with the time of day.

According to a second aspect of the present invention, there is provided an information-processing method for receiving and processing predetermined program data. The information-processing method includes extracting image data and audio data of a program selected by a user, obtaining information related to the selected program, and setting a control parameter for controlling an image data display or an audio data output of the selected program in accordance with the related information.

In the information-processing method, the extracting step may extract the image data and the audio data of the selected program from a transport stream.

In the information-processing method, the obtaining step may obtain the related information from service information included in the transport stream.

The information-processing method may further include storing the control parameter.

The information-processing method may further include adjusting the control parameter in accordance with input from the user.

In the information-processing method, the control parameter may control the brightness or the sharpness of the image data display.

In the information-processing method, the control parameter may be adjusted in accordance with the time of day.

According to a third aspect of the present invention, a storage medium is recorded with a computer-readable program for receiving and processing predetermined program data. The program includes extracting image data and audio data of a program selected by a user, obtaining information related to the selected program, and setting a control parameter for controlling an image data display or an audio data output of the selected program in accordance with the related information.

According to the information-processing device, the information-processing method, and the storage medium, since the control parameter for controlling the display of the image data of the program is set in accordance with the related information for the program selected by the user, the user can easily watch the program with optimal image quality.

DETAILED DESCRIPTION

Figure 1:
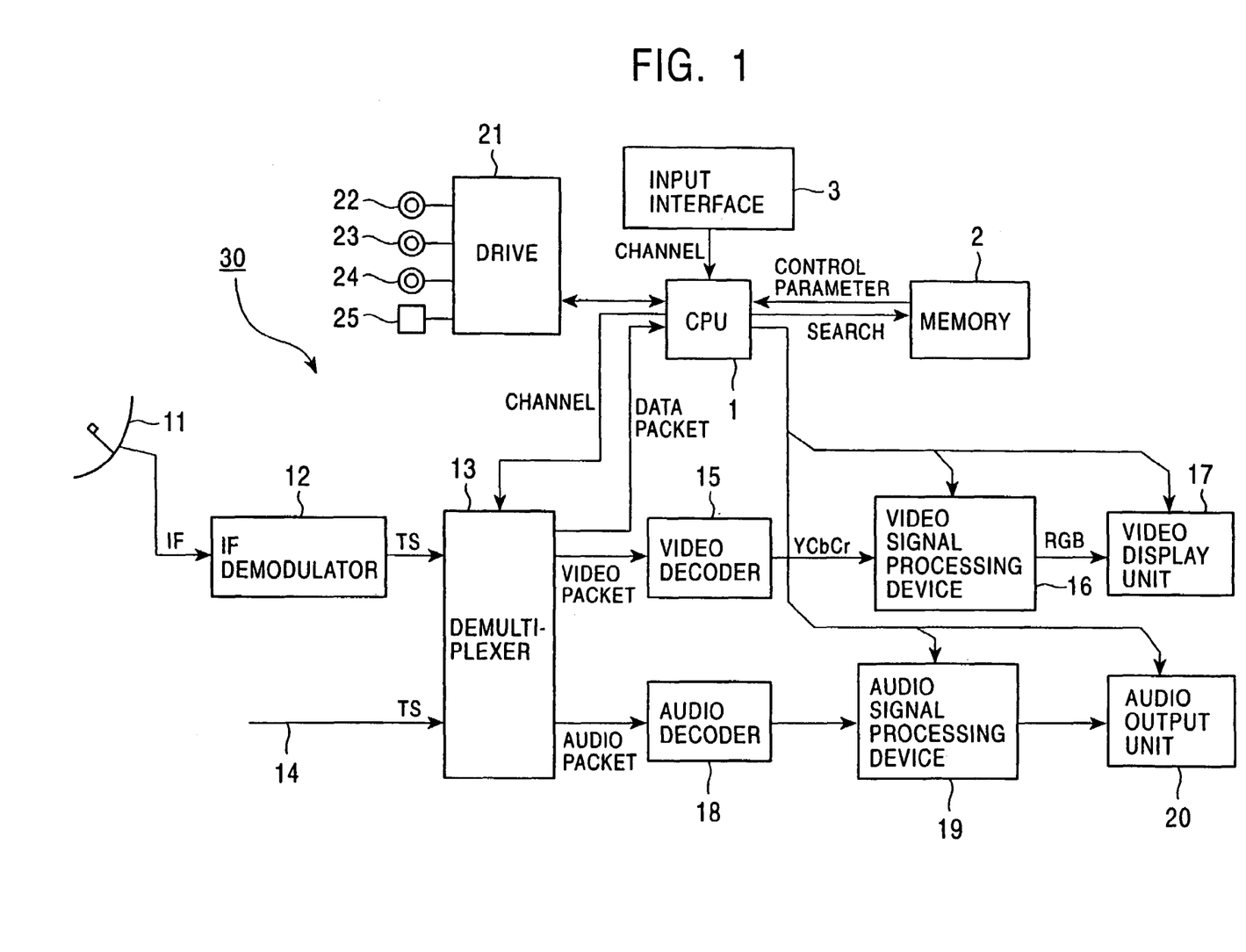
FIG. 1 is a block diagram showing an example construction of a television receiver according to the present invention.

FIG. 1 shows an example construction of a television receiver 30 for receiving digital broadcasting from a broadcast station (not shown) and outputting video and audio data.

An antenna 11 receives a digital broadcasting signal and outputs the signal as an IF (Intermediate Frequency) signal to an IF demodulator 12. The IF demodulator 12 demodulates the IF signal and outputs the demodulated signal as a transport stream to a demultiplexer 13.

A transmission path 14 is a path for a transport stream provided from a CATV system, a network system, or the like, or a path for a transport stream provided from a storage medium such as a hard disk (not shown). This transport stream is also input to the demultiplexer 13.

From the transport stream packets (hereinafter, referred to as TS packets) constituting the transport stream provided via the antenna 11 or the transmission path 14, the demultiplexer 13 separates a PAT (Program Associate Table), a PMT (Program Map Table), a scramble key for descrambling a scrambled transport stream, a TS packet including data used for miscellaneous control, a TS packet including video data, and a TS packet including audio data. The demultiplexer 13 correspondingly outputs these separated data to the CPU 1, a video decoder 15, and an audio decoder 18.

The video data is input into the video decoder 15 in which the input video data is demodulated, using the MPEG method, into a luminance signal (Y) and color-difference signals (Cr, Cb). These demodulated signals are output to a video-signal processing device 16 in which an RGB (Red Green Blue) signal is generated using the luminance signal and the color-difference signals. The generated RGB signal is output to a video display unit 17 such as a CRT or an LCD. In the present invention, signal processing in the video-signal processing device 16 and display processing in the video display unit 17 are controlled in accordance with parameters obtained by the CPU 1, which is described in detail below.

The audio decoder 18 decodes the audio data and outputs the decoded audio data to an audio-signal processing device 19. The audio-signal processing device 19 performs signal processing such as amplification on the decoded audio data and outputs the processed data to an audio output unit 20 such as a speaker.

Figure 3:
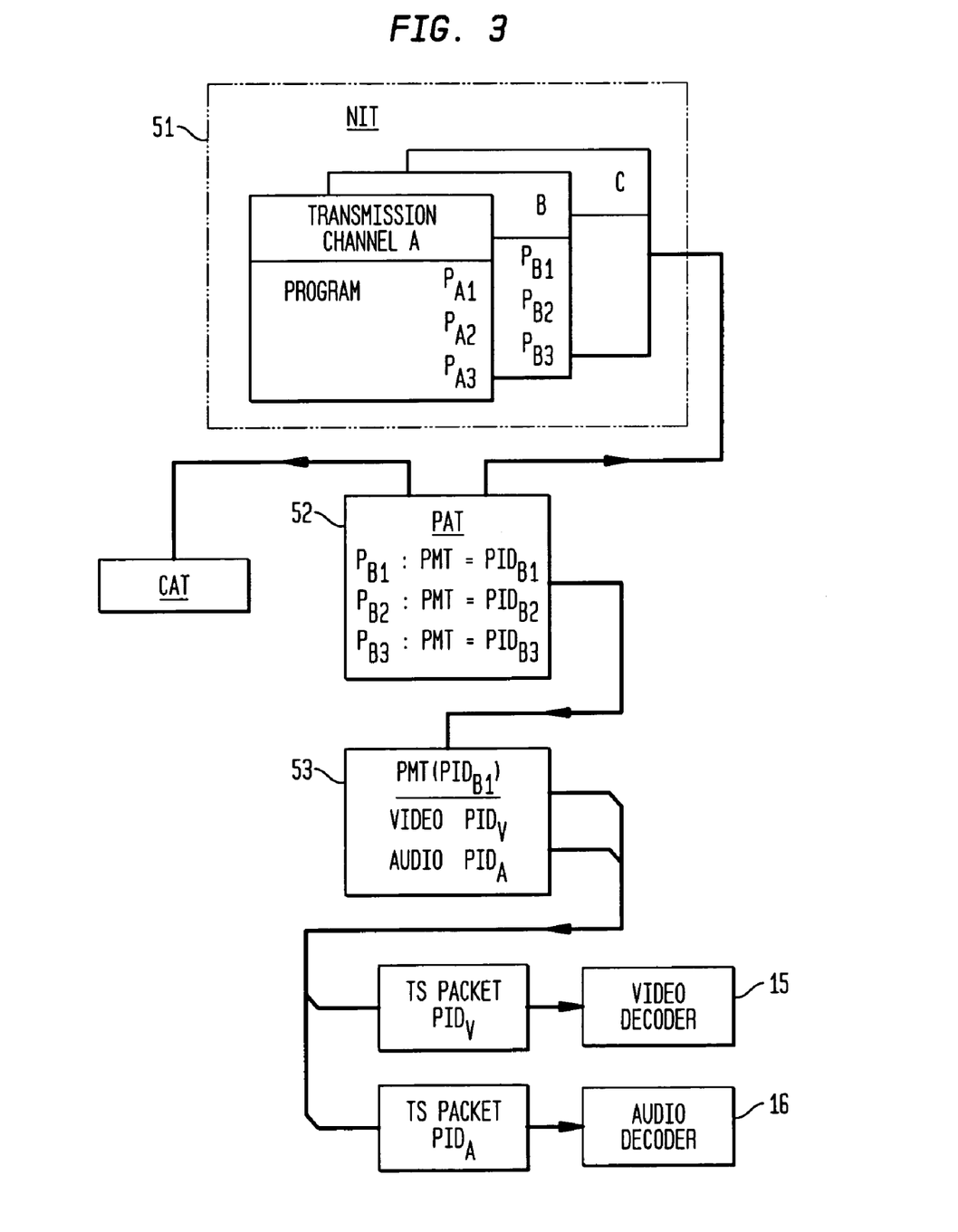
FIG. 3 is an illustration of program specific information (PSI)

A data packet includes PSI (Program Specific Information) data and SI (Service Information) data. The PSI represents program specification information defined by MPEG. With reference to FIG. 3, the PSI includes four tables, consisting of PAT, PMT, NIT (Network Information Table), and CAT (Conditional Access Table), and various descriptors. The SI is information that a broadcast provider uses for its own purpose. EPG (Electronic Program Guide) comprises the PSI data and the SI data.

When the CPU 1 receives the data packet, the content of the data packet is stored in a memory 2. An input interface 3 outputs a signal corresponding to the user's operation to the CPU 1. The CPU 1 controls the demultiplexer 13 in accordance with the user's input, so that the user selects a predetermined broadcast channel.

A drive 21 is connected to a magnetic disk 22, an optical disk 23, a magneto-optical disk 24, and a semiconductor memory 25 in which data is written and read.

Figure 2:
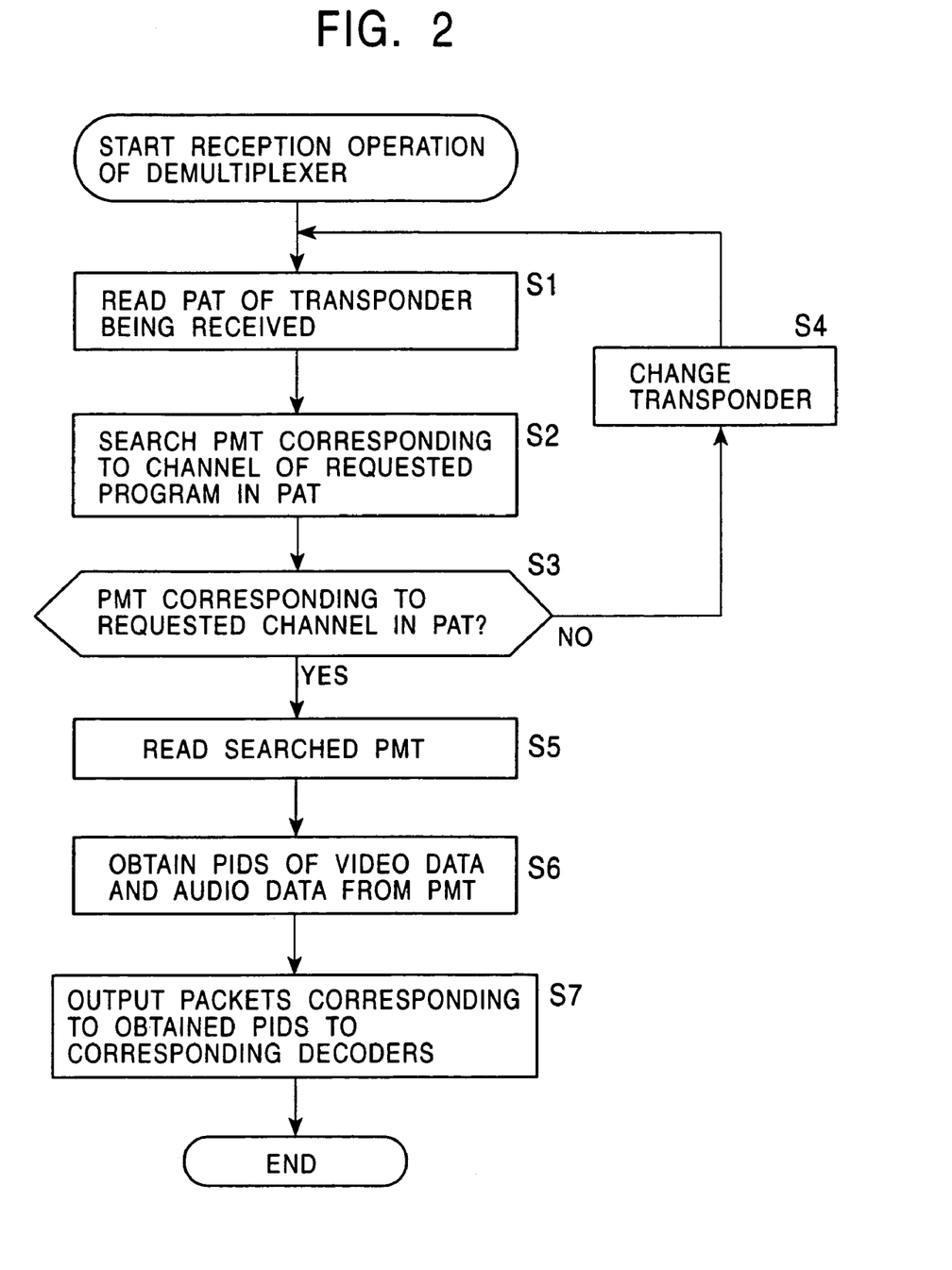
FIG. 2 is a flowchart illustrating an operation of a demultiplexer in FIG. 1.

The reception operation in the demultiplexer 13 which is performed when the user selects a desired broadcast program is described with reference to the flowchart in FIG. 2.

When the user selects a channel (broadcast channel) of the desired program by operating the input interface 3, the CPU 1 requests the demultiplexer 13 to receive the broadcast channel of this program. In response to this request, at step S1 the demultiplexer 13 reads the TS packet storing the PAT of a transponder (satellite relay), that is, the TS packet whose PID (Packet Identification) is 0, via the antenna 11 from the transport stream being received. As shown in FIG. 3, the PAT includes the PMTs of all programs contained in the transport stream of the transmission channel being received corresponding to the transponder. The PMT of each program includes the PIDs of the packets containing video data and audio data constituting the broadcast program.

In the example shown in FIG. 3, a transmission channel B includes broadcast programs (broadcast channels) PB1, PB2, and PB3. A PAT 52 includes the PMTs of the broadcast programs of the transmission channel B. A PMT 53 of the broadcast program PB1 includes PIDV and PIDA, which are PIDs of a packet containing video data and a packet containing audio data, respectively, the video data and the audio data constituting the broadcast program PB1.

At step S2, the demultiplexer 13 searches for the PMT corresponding to the broadcast channel of the broadcast program selected by the user from among the read PAT.

At step S3, the demultiplexer 13 determines whether the PMT corresponding to the broadcast channel of the broadcast program selected by the user is in the read PAT.

If the result of the determination is negative, the process proceeds to step S4.

At step S4, the demultiplexer 13 adjusts the transponder (transmission channel being received).

The PAT includes the PID of the NIT. The NIT includes frequency information of every transponder (transmission channels) constituting a network, satellite orbit position information, transmission information on modulation methods and the like, and broadcast channel information for every transmission channel.

In the example shown in FIG. 3, an NIT 51 includes information concerning the transmission channels A, B, and C. The transport stream of the transmission channel A contains broadcast program data of programs PA1, PA2, and PA3. The transport stream of the transmission channel B contains broadcast program data of programs PB1, PB2, and PB3.

The demultiplexer 13 reads the NIT based on the PID specified in the PAT and searches for a service ID contained in the NIT. Normally, the service ID corresponds to the broadcast channel number of the broadcast program input by the user.

The demultiplexer 13 recognizes the frequency of the transponder (transmission channel) transmitting data of the service (broadcast program) corresponding to the service ID, which is equal to the channel number of the program input by the user. By changing the receiving frequency, the transponder (transmission channel) being received is adjusted.

If the result of the determination is affirmative, the process proceeds to step S5.

At step S5, the demultiplexer 13 reads the PMT of the broadcast channel of the broadcast program selected by the user from the transport stream being received.

At step S6, the demultiplexer 13 obtains the PIDs of the TS packets storing the video data and the audio data constituting the program from PMT read at step S5. At step S7, the demultiplexer 13 obtains the video packet data and the audio packet data of the broadcast channel requested by the user based on the obtained PID and outputs the video packet data and the audio packet data obtained to the video decoder 15 and the audio decoder 18, respectively.

The video decoder 15 decodes the input video packet. The video-signal processing device 16 generates an RGB video signal from the video data decoded by the video decoder 15 and outputs the generated video signal to the video display unit 17 which displays the video signal.

The audio decoder 18 decodes the input audio packet. The audio-signal processing device 19 processes the decoded data and outputs the processed data to the audio output unit 20 from which the processed data is output.

The CPU 1 controls signal processing in the video-signal processing device 16 and the display state of image data shown on the video display unit 17 using control parameters stored in the memory 2 based on related information (including the PSI data and the SI data) on the broadcast program. This display control is described with reference to the flowchart in FIG. 4.

Figure 4:
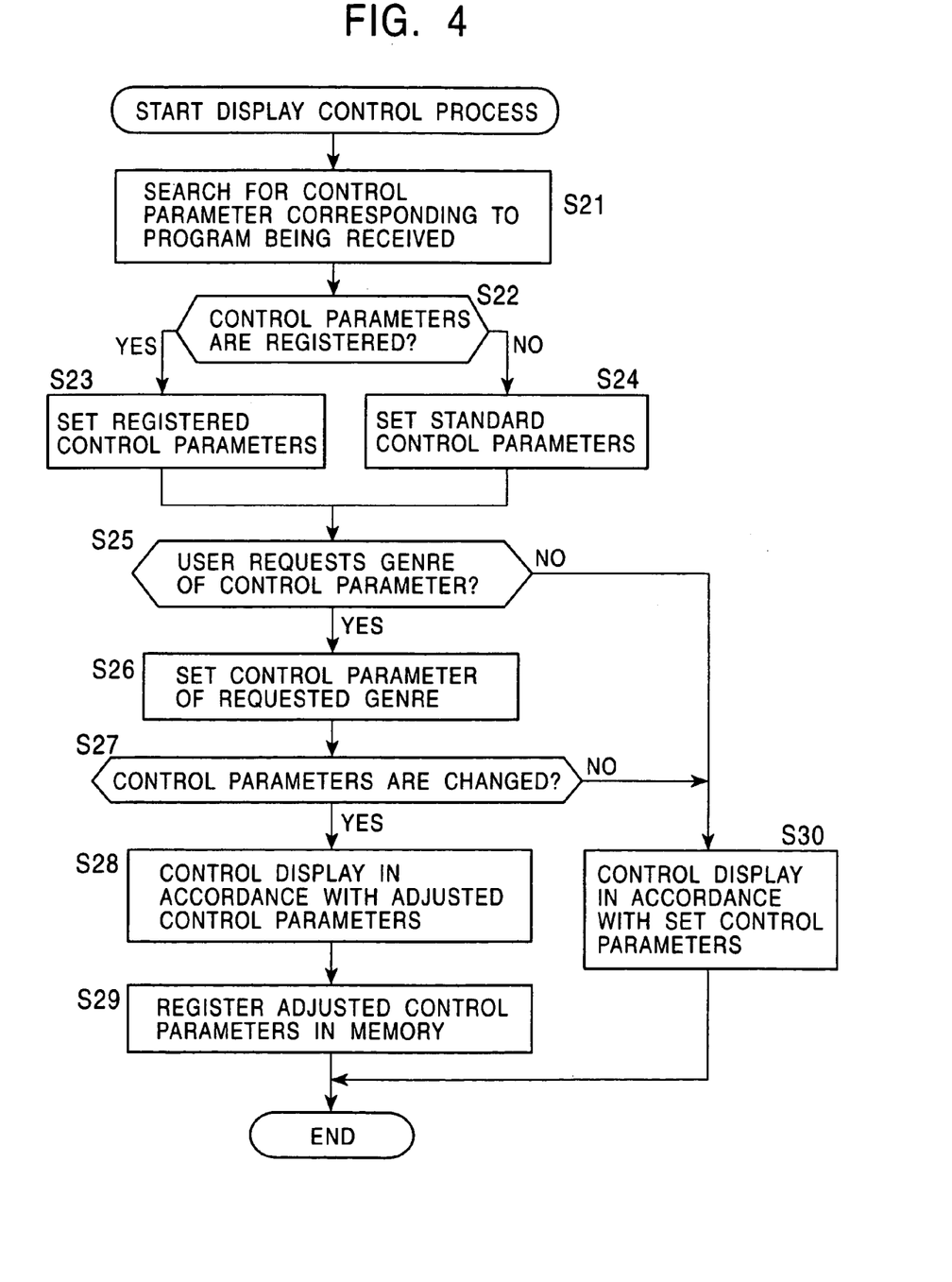
FIG. 4 is a flowchart illustrating an operation of a CPU in FIG. 1.

At step S21, the CPU 1 reads the genre of the broadcast program being received from PSI data or SI data and determines whether the control parameters corresponding to the read genre are registered in the memory 2.

The control parameters, corresponding to the program genres, for controlling signal processing in the video-signal processing device 16 and the video display unit 17 are pre-registered in the memory 2. Example control parameters are described with reference to FIGS. 5A and 5B.

Figure 5A:
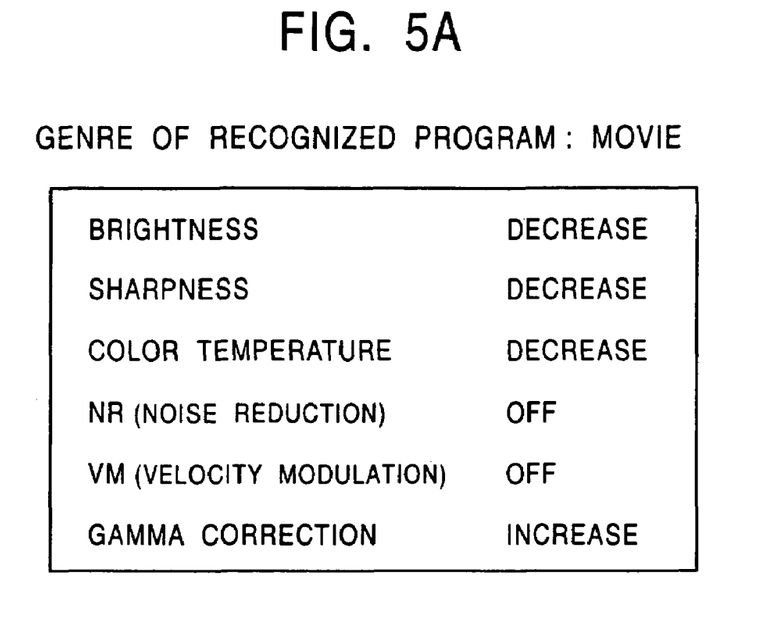
FIGS. 5A and 5B are example correspondence tables between program genre and control parameters.

FIG. 5A shows the example control parameters in a case in which the genre of a broadcast program is a movie. The example control parameters are set as follows:

The brightness is decreased;

The sharpness is decreased;

The color temperature is decreased;

NR (Noise Reduction) is off;

VM (Velocity Modulation) is off; and

Gamma correction is increased.

The CPU 1 controls signal processing in the video-signal processing device 16 and the video display unit 17 based on these control parameters. This enables subtle gradations in dark parts, outlines, and colors of the image data to be displayed in a natural manner and can display the image data with its original film texture.

Figure 5B:
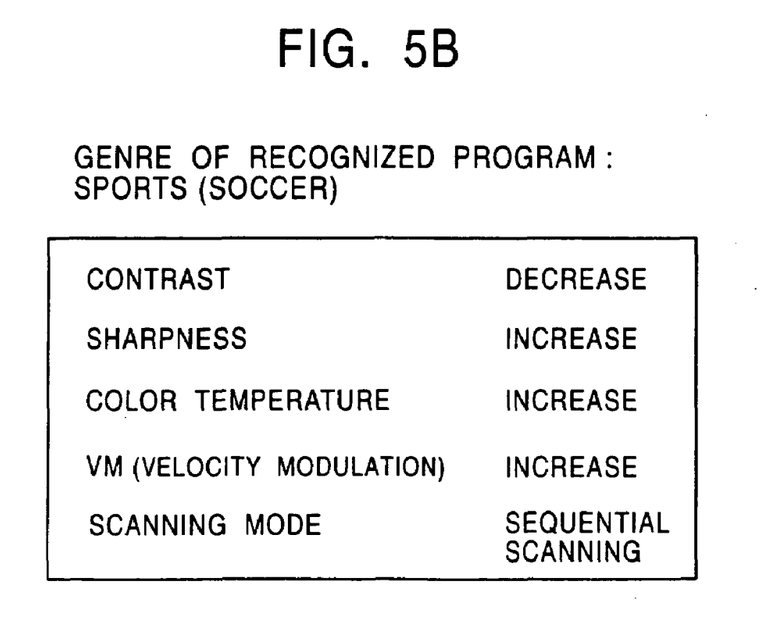

FIG. 5B shows the example control parameters in a case in which the genre of a broadcast program is a sport (soccer). The example control parameters are set as follows:

The contrast is decreased;

The sharpness is increased;

The color temperature is increased;

VM is increased; and

A scanning mode is set to sequential scanning.

The CPU 1 controls signal processing in the video-signal processing device 16 and the video display unit 17 based on these control parameters. Thus, aggressive movements of players and sudden camera movement can be clearly displayed.

At step S22, the CPU 1 determines whether the control parameters are registered in the memory 2 based on the search result. If the determination is affirmative, the process proceeds to step S23. The CPU 1 sets the current control parameters for controlling signal processing in the video-signal processing device 16 and the video display unit 17 in accordance with the registered control parameters. For example, when the user selects the program whose genre is the movie, the CPU 1 sets the control parameters shown in FIG. 5A.

On the other hand, at step S22, if the determination is negative, the process proceeds to step S24. At step S24, the CPU 1 obtains standard control parameters from the memory 2 as the current control parameters.

In the present invention, the user can adjust a control parameter setting by operating the input interface 3 in accordance with the user's preference. After processing is preformed either at step S23 or step S24, the process proceeds to step S25. At step S25, in order to perform the control parameter setting, the CPU 1 determines whether the user has specified a broadcast program genre.

When the user adjusts the control parameters, which are set based on data transmitted from a broadcast station, and specifies the broadcast program genre by operating the input interface 3 so that the image data is displayed using the control parameters pre-registered in the memory 2 that correspond to the specified broadcast program genre, it is determined at step S25 that the broadcast program genre is specified. The process proceeds to step S26 in which the CPU 1 sets the current control parameters using the control parameter setting in which the user adjusts the control parameters for each broadcast program genre and the adjusted control parameters are pre-registered in the memory 2.

At step S27, the CPU 1 determines whether further adjustments have been made to the control parameters which are set at step S26 in accordance with the user's operation of the input interface 3.

If the result of the determination is affirmative at step S27, the process proceeds to step S28. At step S28, the CPU 1 controls signal processing in the video-signal processing device 16 and the video display unit 17 in accordance with the adjusted control parameters to display the image data.

The process proceeds to step S29. The CPU 1 registers the adjusted control parameters in accordance with the user's operation of the input interface 3 in the memory 2 as the control parameters corresponding to the program genre.

Thereafter, when the user selects the same program (one of this series of programs) or a program of the same genre, the image data obtained by performing signal processing in the video-signal processing device 16 and the video display unit 17 using the same control parameters is displayed.

If the result of the determination at step S25 is negative, that is, display control is performed using the control parameter based on the genre specified by the broadcast station or the standard control parameter, the process proceeds to step S30. At step S30, the image data obtained by performing signal processing in the video-signal processing device 16 and the video display unit 17 using the current-set control parameters is displayed.

If the result of the determination at step S27 is negative, the process proceeds to step S30. At step S30, the image data obtained by performing signal processing in the video-signal processing device 16 and the video display unit 17 using the control parameters registered by the user is displayed.

The control parameters are registered so as to correspond to the genres of the broadcast programs. Alternatively, the control parameters may be registered so as to correspond to the name, information, the broadcast program name, the broadcast date and time, the content, or the current date and time concerning the transmission channel transmitted via the transport stream having program data therein.

Although a case in which the present invention is applied to signal processing and output control over the video signal has been described, the present invention may be applied to signal processing and output control over the audio signal. Audio signals may be processed and output in accordance with music genre data (rock music, popular music, and classical music) or performance place data (a studio, a live house, and a karaoke box) contained in the packets extracted by the demultiplexer 13.

The control parameters may be adjusted in accordance with the broadcast date and time. For example, when a broadcast program is broadcast around midnight, the video-signal contrast of the broadcast program may be decreased compared to the video-signal contrast of the broadcast program which is broadcast during the daytime.

In addition, when a plurality of images shown on a plurality of corresponding windows is simultaneously displayed on a screen, display (output) may be controlled for each image displayed on the corresponding window.

A case in which the present invention is applied to the television receiver is described. The present invention may be applied to IRD (Integrated Receiver/Decoder) and any other device such as a personal computer that processes digital data.

The above-described operations may be implemented using hardware or software. When these operations are implemented using software, the programs constituting the software may be installed from a storage medium on a computer embedded in dedicated hardware. Alternatively, the programs may be installed from the storage medium on, for example, a general-purpose personal computer that executes various functions by installing various programs.

The storage medium is distributed, independent of the computer, for providing the programs to the user. This storage medium may be constructed using a package medium using a magnetic disk 22 (floppy disk), an optical disk 23 such as a CD-ROM (Compact Disk-Read Only Memory) or a DVD (Digital Versatile Disk), a magneto-optical disk 24 such as a MD (Mini-Disk), or a semiconductor memory 25. Alternatively, it may be constructed using the memory 2, preinstalled in the computer, which has the program stored therein.

In the present application, the steps constituting the program stored on the storage medium may be executed in a time-series manner in accordance with the described order. Some of them may be concurrently executed or may be discretely executed.

In the present application, the system is the overall device consisting of a plurality of devices.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information-processing device for receiving and processing predetermined program data, said information-processing device comprising:
   an extracting unit operable to extract image data and audio data of a program selected by a user;
   an obtaining unit operable to obtain information related to said selected program;
   a memory operable to store control parameters in response to adjustments made by a user during reception of said selected program, said user adjusted control parameters including at least one adjusted parameter corresponding to program genre data, said at least one adjusted parameter being registered in a group of user adjusted program genre data;
   a setting unit operable to set a control parameter for controlling an image data display or an audio data output of said selected program based on said at least one adjusted parameter and said related information if said program genre data is registered in said group of user adjusted program genre data; and
   the setting unit being further operable to change control information including velocity modulation or gamma correction in response to the program genre data.

2. An information-processing device according to claim 1, wherein said extracting unit extracts said image data and said audio data of said selected program from a transport stream.

3. An information-processing device according to claim 2, wherein said obtaining unit obtains said related information from service information included in said transport stream.

4. An information-processing device according to claim 1, further comprising an adjusting unit operable to adjust said control parameter in accordance with input from the user.

5. An information-processing device according to claim 1, wherein said control parameter controls the brightness or the sharpness of said image data display.

6. An information-processing device according to claim 1, wherein said control parameter is adjusted in accordance with the time of day.

7. An information-processing device according to claim 1, wherein said setting unit is operable to set a plurality of control parameters that correspond to a plurality of image displays.

8. An information-processing method for receiving and processing predetermined program data, comprising:
   extracting image data and audio data associated with a program selected by a user;
   storing control parameters that are adjusted by a user during reception of said selected program, said user adjusted control parameters including at least one adjusted parameter corresponding to program genre data, said at least one adjusted parameter being registered in a group of user adjusted program genre data;
   accessing said at least one adjusted parameter corresponding to program genre data;
   processing the image data based on control parameters including velocity modulation or gamma correction which change based on the program genre data;
   obtaining information related to said selected program; and
   setting a control parameter for controlling an image data display or an audio data output of said selected program based on said at least one adjusted control parameter and said related information.

9. An information-processing method according to claim 8, wherein said extracting step extracts said image data and said audio data of said selected program from a transport stream.

10. An information-processing method according to claim 9, wherein said obtaining step obtains said related information from service information included in said transport stream.

11. An information-processing method according to claim 8, further comprising adjusting said control parameter in accordance with input from the user.

12. An information-processing method according to claim 8, wherein said control parameter controls the brightness or the sharpness of said image data display.

13. An information-processing method according to claim 8, wherein said control parameter is adjusted in accordance with the time of day.

14. A storage medium recorded with a computer-readable program for receiving and processing predetermined program data, said program comprising:

extracting image data and audio data of a program selected by a user;

storing, in a memory, control parameters that are adjusted by a user during reception of said selected program, said user adjusted control parameters including at least one adjusted parameter corresponding to program genre data, said at least one adjusted parameter being registered in a group of user adjusted program genre data;

accessing from the memory at least one control parameter adjusted by the user corresponding to program genre data;

obtaining information related to said selected program;

setting a control parameter for controlling an image data display or an audio data output of said selected program based on the at least one control parameter adjusted by the user and said related information; and     processing the image data based on control parameters including velocity modulation or gamma correction that change in response to a change in the program genre data.

15. A storage medium according to claim 14, further comprising setting a plurality of control parameters for controlling a plurality of image data displays or audio data outputs of said selected program based on a plurality of control parameters adjusted by the user.

* * * * *